July 1, 1952  A. F. TURNER  2,601,806
FRUSTRATED TOTAL REFLECTION INTERFERENCE FILTER
Filed Sept. 30, 1948  2 SHEETS—SHEET 1

Inventor
ARTHUR F. TURNER
By Edward H. Rumpston
Attorney

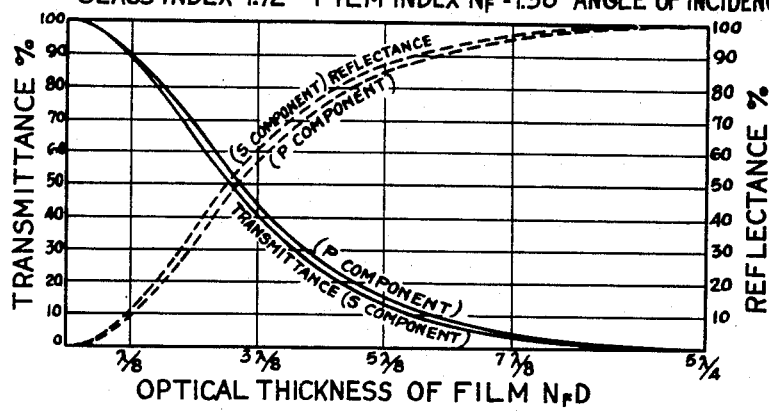
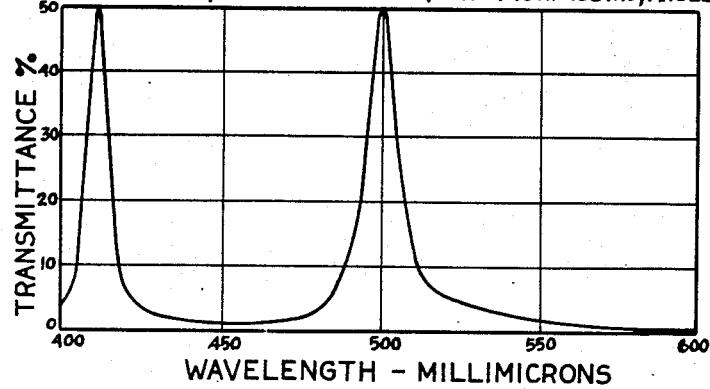
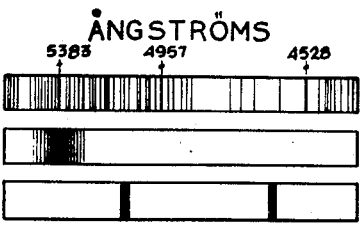
Inventor
ARTHUR F. TURNER
By Edward H. Cumpston
Attorney Patented July 1, 1952

2,601,806

UNITED STATES PATENT OFFICE 2,601,806

FRUSTRATED TOTAL REFLECTION
INTERFERENCE FILTER

Arthur F. Turner, Brighton, N. Y., assignor to
Bausch & Lomb Optical Company, Rochester,
N. Y., a corporation of New York Application September 30, 1948, Serial No. 51,945

3 Claims. (Cl. 88—109)

1

This invention relates to light filters and more particularly to filters of the interference type. Interference filters have been known consisting of two high reflecting metallic layers separated from each other by a predetermined distance, and such filters have been commonly made with metallic films of silver to obtain high reflection, and an evaporated film of some low index material, usually magnesium fluoride, to separate the silver films. Such filters, however, have been characterized by several disadvantageous features. They have involved a relatively high degree of absorption in the light transmitted. Aside from the waste of light, this absorption sets a lower limit to the narrowness of the pass bands obtainable with them. They have also been subject to the restriction that suitable metallic films are not available for use in some regions of the spectrum and, because of these and other disadvantages, such filters have been of limited application.

One object of the present invention, therefore, is to supply a filter of the interference type which is substantially free from the absorption of transmitted light.

Another object is to provide such a filter having substantially any desired width of transmission or pass band, especially bands of extremely narrow width.

To these and other ends the invention resides in certain improvements and combinations of parts, all as will be hereinafter more fully described, the novel features being pointed out in the claims at the end of the specification.

In the drawings:

Fig. 4 shows such curves for various optical thicknesses of the frustrated total reflection film with a given angle of incidence and given glass and film indices;

Fig. 5 shows the transmittance curve of an interference filter embodying the present invention under stated conditions, and Fig. 6 shows a portion of the iron spectrum

2 in comparison with the transmissions of a metal interference filter of the prior art and of the frustrated total reflection interference filter embodying the present invention.

I have found that the above objects may be attained by means of an interference filter in which the metallic films are replaced with non-absorbing films, using the principle variously known as frustrated, degenerate or partial total reflection, and employed in the light beam divider disclosed in Letters Patent granted jointly to me and Robert B. Horsfall, Jr., No. 2,422,376, dated June 17, 1947.

Figure 2:
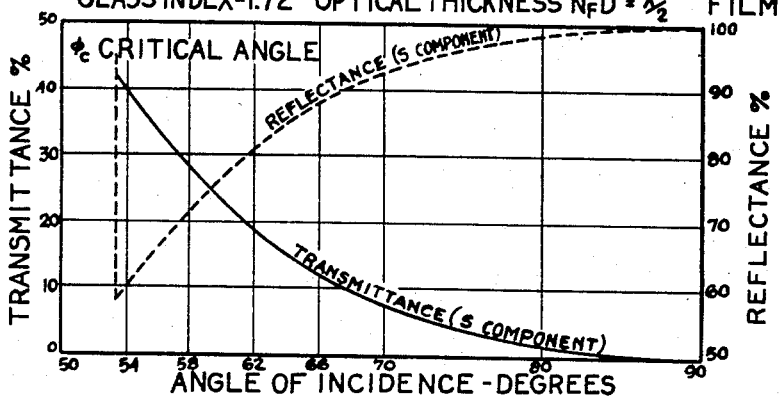
Fig. 2 shows the reflectance and transmittance curves of a frustrated total reflection film such as employed in the interference filter of the invention for various angles of incidence, with a given optical thickness of the film and given glass and film indices.

Such frustrated total reflection occurs when light is incident upon a thin film of index $n_2$ between two media of higher index $n_1$ such that the angle of incidence $\phi$ exceeds the critical angle $\phi_c$. The critical angle is found as usual by applying Snell's law and is given by the equation: $n_1 \sin \phi_c = n_2$. In such frustrated total reflection, the reflectance depends on the angle of incidence, the relative indices of the film and adjacent media, and the thickness of the film. The dependence of the $s$ component on angle of incidence in reflection and transmission is shown in Fig. 2 for a film of index 1.38 and an optical thickness of a half wave between glass prisms of index 1.72, the coordinates being the transmittance on the left and reflectance on the right. For this assemblage the critical angle is 53.4°. At greater angles of incidence, the reflectance is not immediately 100% but rather increases gradually from 57.8% at the critical angle to 100% at 90° angle of incidence. The behavior of the $p$ component is similar to that of the $s$ component in the frustrated total reflection region, but with the reflectance of the former always less than or equal to that of the latter.

Figure 3:
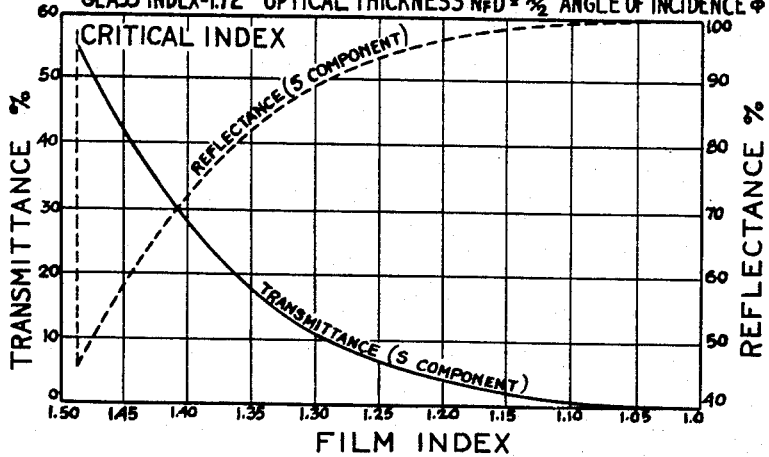
Fig. 3 shows such curves for various film indices for a given thickness of the film and a given angle of incidence and glass index.

The dependence of the $s$ component in reflection and transmission, on the index of the film is shown in Fig. 3 for a prism index of 1.72, an angle of incidence of 60°, and an optical thickness of the film of a half wave. Here the reflectance at the critical index is 45.1% and rises steadily with decreasing film index to 99.6% at an index of 1.0.

The dependence of both the $s$ and $p$ components on the optical film thickness is shown in Fig. 4 for a film index of 1.38, prisms of index 1.72, and an angle of incidence of 60°. The reflectances are zero at zero film thickness and rise steadily with increasing optical thickness of the film to about 99.4% at an optical thickness of 5 $\lambda/4$. The $s$ component is always reflected as strong or stronger than the p component. The most convenient way of controlling reflectance and the way that is used in practice is by varying the thickness of the film.

Figs. 2, 3 and 4 constitute exemplary data for frustrated total reflection films using specific values of the optical constants involved. It will be appreciated by those skilled in the art that frustrated total reflection is not limited to the particular cases shown but that innumerable other combinations may be used. Furthermore, although glass is used as an example of prism material, it will be appreciated that any solid or liquid light transmitting substance may be used, chosen according to its suitability from the point of view of refractive index and transparency in the wave length region of interest.

It is important to note that in every case no light is lost by absorption, the films and glass being assumed substantially absorption free as they are in practice. The sums of the intensities of the reflected and transmitted beams always add up to 100%.

Figure 1:
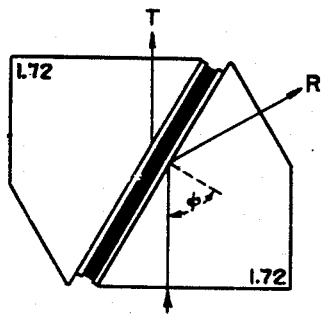
Fig. 1 is an enlarged diagrammatic view of an interference filter combination embodying the present invention.

An interference filter, in accordance with the present invention and using frustrated total reflection, is made by filming the hypotenuse of a prism with a transparent film of low index material, such, for example, as cryolite (index 1.34), or magnesium fluoride (index 1.38), to produce high reflection by virtue of the frustrated total reflection, a spacer layer of higher index material, such, for example, as zinc sulphide, and a second film of low index material such as the first film above, to produce a second highly reflecting frustrated total reflection film. A second high index prism is then cemented to the filmed side of the first high index prism, the cement having an index approaching that of the prism material and preferably having the same index. Alternatively, the second prism may be optically contacted directly to the films. This is shown in Fig. 1. The refractive index of the spacer and the cement used must be high enough that no frustrated total reflection can take place at it. For any given angle of incidence $\phi$ within the prism having an index $n_1$ this lowest limit of the spacer index $n_s$ is given by the equation: $n_s = n_1 \sin \phi$.

The wave length position of the pass band of the filter is controlled by the thickness of the spacer layer. At whatever wave lengths its effective optical thickness is a half wave length or integral multiple thereof a pass band will occur. The effective optical thickness will depend on the angle of incidence, an interference film of given optical thickness at zero angle of incidence being effectively thinner at all other angles by the cosine of the angle. By "effectively thinner" is meant here, as usual, that the phase retardations between rays arising from multiple reflection within the film become smaller. In addition the effective optical thickness will also incorporate any phase shifts occurring at the frustrated total reflection films. These are retardations lying in general between 90° and 180°. The phase shift retardations are greater for the s component than the p component. As a consequence, the effective spacer thickness is different for the two states of polarization, and the transmission bands of the filter occur as doublets, the s component peak being toward longer wave lengths than the p component peak.

In Fig. 5 is shown the spectrophotometric transmission curve of such a filter made with frustrated total reflection films of magnesium fluoride three quarter wave lengths thick for light of wave length 435 millimicrons at normal incidence, and a spacer of zinc sulfide whose optical thickness at normal incidence is 3.5 quarter wave lengths for light of the same wave length. The refractive indices of the glass of the prisms, of the magnesium fluoride and of the zinc sulfide are 1.72, 1.38 and 2.30, respectively.

When angle effects are considered, the high index spacer is half wave thick at 580 millimicrons, so that the filter should have a peak at 580 millimicrons, barring unusual phase shifts. The fact that there are two peaks at entirely different wave lengths, namely 410 and 500 millimicrons, indicates that the phase shifts at the frustrated total reflecting films actually are different from zero or 180 degrees. Theory shows that the phase shifts of the p and s components in reflection from a frustrated total reflection film are retardations from 90 to 180 degrees, the retardation of the p component being smaller than that of the s component. Because of this difference the filter transmission bands occur in pairs as explained above. The two peaks of a pair are linearly polarized. The transmission at each peak is 100% for incident light correspondingly polarized. The measured results for both the peak transmission and the half widths of actual filters agree well with calculated values. The narrowness or half widths of the transmission bands may be controlled in two ways, viz., by using different orders of interference as determined by the thickness of the spacer layer, and by varying the thickness of the frustrated total reflection films. It is well known that in interference type filters the half widths decrease as the spacer thickness is made equal to higher integral multiples of a half wave length and the same principle applies to the present frustrated total reflection filters. Thus if the spacer of Fig. 5 were made twice as thick, the half widths would be about one half of those shown, and so on for higher orders. With respect to the second means of controlling half widths it is also known that an increase in the reflectance of the highly reflecting layers of a metallic film interference filter results in a sharpening of the transmission peaks. The same result holds true for the interference filters of the present invention. In them, the reflectance of the frustrated total reflection films depends on the film index and thickness, on the prism index and on angle of incidence as illustrated in Figs. 2–4. For any given prism-film combination, the reflectance of the frustrated total reflection components of the filter may be made any desired value by controlling the film thickness, as has been shown in Fig. 4. A greater thickness results in a higher reflectance of the film and a narrower width of the pass band. Useful frustrated total reflection interference filters have been made for visible light using frustrated total reflection films of thickness from three to seven quarter wave lengths. This range is given in an illustrative rather than a limiting sense. Either thicker or thinner frustrated total reflection films may be used depending on the pass band requirements on the one hand, and, on the other, on the practical limitations in producing optically first class, thicker, plano-parallel films. It should also be noted that an increase in half width resulting from a decrease in reflectance of the frustrated total reflection films is accompanied by an increase in background transmission of the filter.

In Fig. 6 is shown photographic comparison of the behavior of a filter of the prior art with one of the subject invention. At the top is an iron spectrum with three wave lengths marked for orientation purposes. Of the two filters whose transmission bands are shown, the first is an ordinary second order interference filter employing silver films and the next a frustrated total reflection interference filter. The second order metal interference filter has a peak transmission of 40% and a half width of 9 millimicrons. The frustrated total reflection filter is a second order filter having relatively high reflecting films 5 λ/4 thick, and giving very sharp lines of the order of one-half millimicron. It was constructed as shown in Fig. 1 using frustrated total reflection films of high vacuum evaporated magnesium fluoride each of optical thickness equal to five quarter wave lengths and an evaporated zinc sulfide spacer of 6.5 quarter wave lengths. The transmission peaks here are much sharper than in the computed example of Fig. 5 for two reasons: (1) the filter is second order as compared with first order and (2) the frustrated total reflection films are thicker.

The location of the transmitted peaks in filters constructed according to the present invention will change when the device is tipped, that is, when the angle of incidence is changed. The wave length positions wander toward shorter wave lengths when the device is tipped so as to increase the angle of incidence on the films. As a typical example a rotation of the prism by one degree will cause a shift in the wave length positions by about 4 millimicrons. The sensitivity to angle of incidence is a factor to be considered in using the filter in diverging or converging light. In general, parallel light should be used, collimated by appropriate optical means.

It may at times be advantageous to use the light reflected from the filter. In Fig. 1 the direction of this light is indicated by the arrow marked R. The reflected portion of the light will contain all of the incident light except that transmitted by the filter. Hence if white light falls upon the filter the reflected light when analyzed will be found to consist of a continuous spectrum crossed by dark lines at the wave lengths corresponding to the peaks of transmission. If viewed through a polarizer alternate black lines will disappear for settings 90° apart.

The invention provides, therefore, a filter which is substantially free from the absorption of light, since the non-metallic films employed are substantially non-absorbing. And it provides a general principle for the construction of a filter for any spectral region, as distinguished from the limitations in this respect on the filters made with metal films. Although the examples chosen are for visible light filters, the same principles may be employed with available materials in the ultra-violet and infra-red.

The invention is useful, for example, in applications requiring the selection of monochromatic radiation from a continuous source of light, or selection of a desired wave length region in the form of a wide transmission band from such a source, or the production of polarized monochromatic light and the like.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. An interference filter comprising a pair of prisms of refractive material having contiguously arranged faces, one of the prisms having an entrance face, a pair of spaced light transmitting films of solid material having low light absorbing properties interposed between the contiguous adjacent faces of the prisms, said films being angularly positioned with respect to said entrance face of one prism whereby the prism directs light rays onto the films at an angle greater than the critical angle for the prism-film interface, said films having refractive indices less than those of the prisms, said films each having a thickness less than a wave length of light so that total reflection does not occur when light rays strike the films at an angle greater than the critical angle for the prism-film interface whereby the relative quantities of reflected and transmitted light will depend upon the thicknesses of the films, and a light transmitting layer of solid non-metallic material interposed between and in optical contact with said films, said layer having a refractive index which is higher than that of said films so that it transmits light rays which are incident thereon at an angle less than the critical angle of said layer with respect to the prism, said layer having a thickness which is optically equivalent to one or more half wave lengths for the angle of incidence employed.

2. An interference filter comprising a pair of prisms of refractive material each having a refractive index of not less than about 1.6, one of said prisms having an entrance face, the other prism having an exit face which is substantially parallel to said entrance face, each of said prisms having an inclined face making an angel of about 60° with the entrance and exit faces, spaced, light transmitting films of non-metallic solid material having low absorbing properties interposed between said prisms and in optical contact with said inclined faces of said prisms, respectively, said films having refractive indices of about 1.3 and having a thickness of the order of a wave length of light, so that frustrated total reflection is produced, whereby the relative quantities of reflected and transmitted light depend upon the thickness of said films, and a light transmitting layer of non-metallic solid material interposed between and spacing said films and having a refractive index of not less than about 1.6 adapted to transmit the light rays incident thereon at an angle not greater than the critical angle of said layer with respect to the prism, said layer having a thickness optically equivalent to one or more half wave lengths for the angle of incidence employed.

3. An interference filter comprising a pair of glass prisms each having a refractive index of not less than about 1.6, one of said prisms having an entrance face, the other prism having an exit face which is substantially parallel to said entrance face, each of said prisms having an inclined face making an angle of not less than about 60° with the entrance and exit faces, spaced, light transmitting films of magnesium fluoride interposed between said prisms and in optical contact with said inclined faces of said prisms, respectively, said films having a thickness of the order of a wave length of light so that frustrated total reflection is produced, whereby the relative quantities of reflected and transmitted light depend upon the thickness of said films, and a light transmitting layer of zinc sulphide interposed between and spacing said films and having a thickness optically equivalent to a half wave length or an integral multiple thereof for the angle of incidence employed.

ARTHUR F. TURNER.

REFERENCES CITED

The following references are of record in the file of this patent:

UNITED STATES PATENTS

| Number | Name | Date |
|---|---|---|
| 2,303,906 | Benford | Dec. 1, 1942 |
| 2,403,731 | MacNeille | July 9, 1946 |
| 2,418,627 | Dimmick | Apr. 8, 1947 |

FOREIGN PATENTS

| Number | Country | Date |
|---|---|---|
| 716,153 | Germany | Jan. 14, 1942 |

OTHER REFERENCES

Leurgans et al., article in Journal of the Optical Society of America, "Frustrated Total Reflection Interference Filters," vol. 37, December 1947, page 983. Publ. American Institute of Physics, New York.

Banning, article in Journal of the Optical Society of America, "Practical Methods of Making and Using Multilayer Films," vol. 37, October 1947, pp. 792 to 797. Publ. American Institute of Physics, New York.